United States Patent
Schmitt

[15] 3,698,418
[45] Oct. 17, 1972

[54] NON-RISE VALVE FOR FAUCETS OR THE LIKE
[72] Inventor: William C. Schmitt, Brown Deer, Wis.
[73] Assignee: Milwaukee Faucets, Inc., Milwaukee, Wis.
[22] Filed: July 1, 1971
[21] Appl. No.: 158,886

[52] U.S. Cl. ............137/315, 137/454.6, 137/636.3, 251/288
[51] Int. Cl. .............................................. F16k 11/06
[58] Field of Search ..............137/315, 454.6, 636.3; 251/288

[56] References Cited

UNITED STATES PATENTS

| 2,796,079 | 6/1957 | Hugg | 137/454.6 X |
| 3,439,701 | 4/1969 | Stella | 137/454.6 X |
| 3,473,551 | 10/1969 | Murauskas | 251/288 X |
| 3,526,250 | 9/1970 | Miller | 137/636.3 X |

Primary Examiner—Harold W. Weakley
Attorney—James E. Nilles

[57] ABSTRACT

A valve for a water faucet or the like of the type which when actuated does not have a part that rises, and which valve includes a rotary sealing plate against which spring loaded seals cooperate to seal the valve when the plate is turned to the "off" position. The valve includes a cartridge which has a stem formed as one piece along with the rotary valve and which cartridge also has a sleeve in which the stem rotates. The assembled sleeve is formed of two sleeves which are held in assembled relationship by means of a recess and projection connection, thereby the upper sleeve can be easily moved axially from the lower sleeve when the valve is to be disassembled. The lower sleeve has a pair of circumferentially spaced slots which function both as a water passage and also as a stop for limiting the rotation of the stem within the assembled sleeve.

7 Claims, 5 Drawing Figures

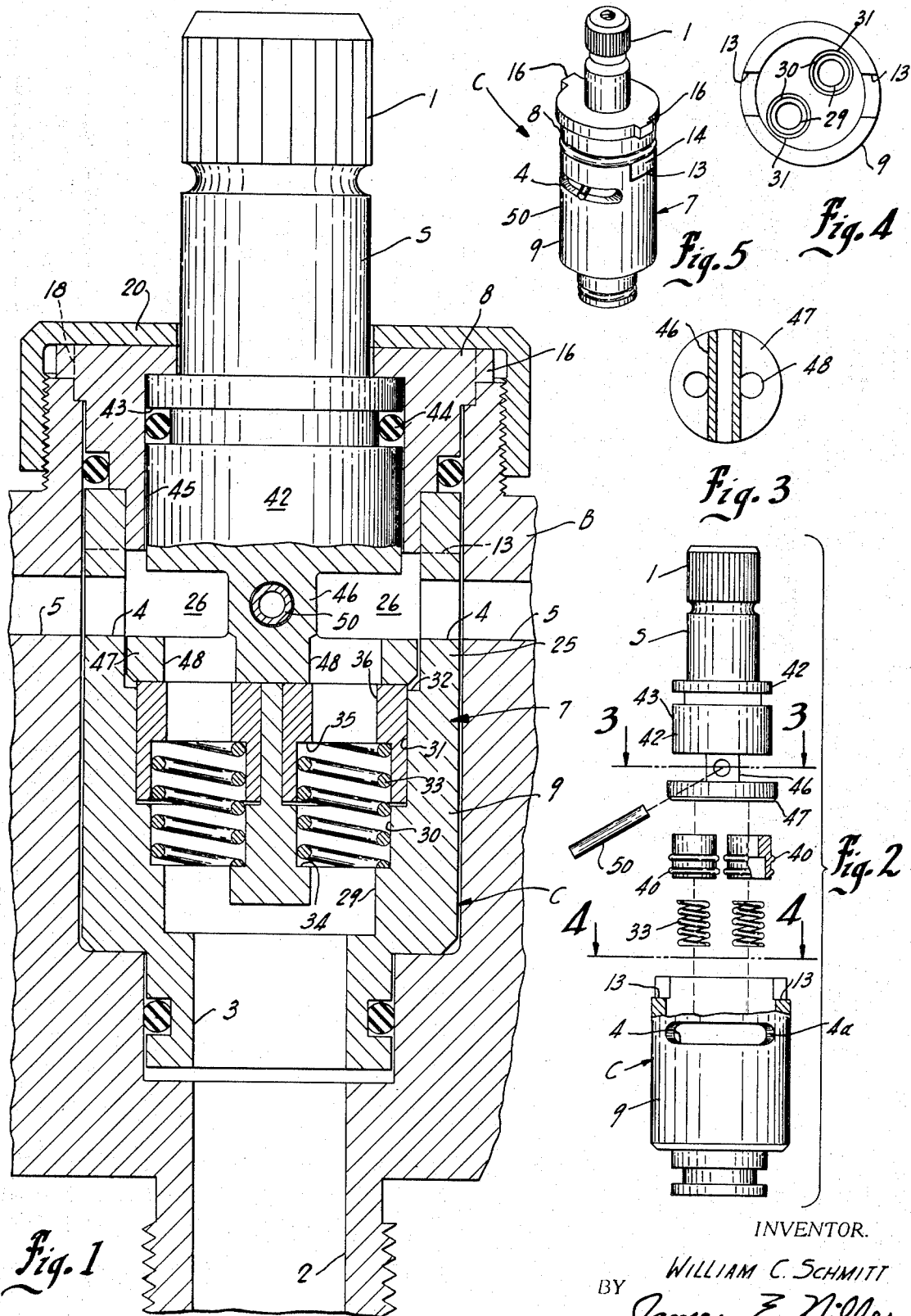
PATENTED OCT 17 1972
3,698,418
INVENTOR.
WILLIAM C. SCHMITT
BY James E. Nilles
ATTORNEY

NON-RISE VALVE FOR FAUCETS OR THE LIKE

BACKGROUND OF THE INVENTION

The invention pertains to valves for water faucets or the like of the non-rise type and in which the valving is accomplished between rotary surfaces and spring loaded inlet seals bearing against one of the rotary members.

Devices of this general character have been proposed, but have heretofore been very complicated and contained numerous parts and were difficult and expensive to manufacture and also required considerable maintenance and repair.

A valve of the general type above referred to is shown in the U.S. Pat. No. 3,372,710, issued Mar. 12, 1968 to L.J. Miller and entitle "Single Handle Faucet Valve."

SUMMARY OF THE INVENTION

The present invention provides a non-rise valve cartridge having a stem rotatable in a two piece sleeve, which sleeve is held in assembled relationship by a recess and projection connection between the two sleeves. This construction permits the upper sleeve to be simply shifted axially from the lower sleeve to disassemble the cartridge. Another aspect of the invention relates to the lower sleeve having circumferentially spaced and transversely arranged slots which function both as a water passage and also as the stop means for limiting the oscillation of the valve stem within the sleeve, resulting in a simplified construction and the elimination of certain parts found in prior art devices. More specifically, the stem has a transversely arranged pin which, when the stem is oscillated, oscillates freely within the slots of the sleeve and without being in frictional sliding contact therewith, and this "floating pin" contributes to smooth operation of the valve.

Another more limited aspect of the invention relates to an improved two piece sleeve assembly in which an upper sleeve has an inwardly turned flange for holding the valve stem captive within the sleeve.

Another aspect of the invention relates to a valve assembly including a sleeve of the above type and in which the two sleeves are held together by a cap of the valve body.

These and other objects and advantages of the present invention will appear hereinafter as this disclosure progresses, reference being had to the accompanying drawings.

BRIEF DESCRIPTION OF THE DRAWINGS

FIG. 1 is a longitudinal sectional view of a valve assembly made in accordance with the present invention;

FIG. 2 is an elevational, exploded view of certain of the parts shown in FIG. 1, but on a reduced scale, and with certain parts shown as broken away or in section for clarity;

FIG. 3 is a sectional view taken along line 3—3 in FIG. 2;

FIG. 4 is a sectional view taken along line 4—4 in FIG. 2; and

FIG. 5 is a perspective view of the cartridge, on a reduced scale.

DESCRIPTION OF THE PREFERRED EMBODIMENT

The non-rise cartridge C provided by the present invention is located within the valve body B and has a stem S oscillatably mounted within the assembled sleeve 7. A suitable knob or lever (not shown) can be secured to the top end 1 of the stem in the known manner so as to be able to rotate the stem within the sleeve. Water pressure enters the valve body through the opening 2 and enters the opening 3 in the inlet end of the sleeve. The water, after passing through the cartridge, in a manner to be described, then flows out of the outlet openings 4 in the sleeve and through the discharge passage 5 of the body.

The assembled sleeve 7 of the valve is comprised of an upper sleeve 8 and a lower sleeve 9 which are disengagably connected together as follows. The upper end of the lower sleeve has a pair of diametrically opposed recesses 13 opening axially upwardly therefrom, and the upper sleeve has a pair of complementary shaped and downwardly extending projections 14 which are adapted to slide into the recesses 13 of the lower sleeve. Thus the sleeve rotates as a unit, and in order to disassemble the sleeve, it is only necessary to pull the upper sleeve axially from the lower sleeve.

It will be noted that the upper sleeve 8 has a pair of diametrically opposed lugs 16 which extend laterally from the upper end of the sleeve and are adapted to seat in a pair of complementary recesses 18 in the upper end of the valve body B. In this manner, the upper sleeve, as well as the lower sleeve are prevented from rotating in the valve body B. An internally threaded cap 20 threadably engages the periphery of the upper end of the body B and when tightened on the body acts to hold the assembled sleeve 7 captive in the body.

As previously mentioned, the lower sleeve 9 has a pair of diametrically opposed fluid passages in the form of slots 4 formed in its cylindrical wall 25, thereby placing the interior chamber 26 of the sleeve in communication with the outlet 5 in the valve body. The slots are arranged transversely in the sleeve and terminate in ends 4a.

A pair of inlet passages extend from the inlet 3 to the inner chamber 26 and these passages are comprised of bore 29, and an intermediate counterbore 30 and a large bore 31 adjacent the sealing surface 32. Mounted within the intermediate bore are springs 33 which bear against the shoulder 34 formed between bore 29 and counterbore 30 and which also bear against shoulder 35 of the cylindrical inlet seal 36. This inlet seal fits in the large bore 31 and is urged towards chamber 26 by springs 33. Annular ridges 40 around the seals 36 aid in sealing and act in effect as O-rings.

The stem S includes a cylindrical portion 42 adjacent the outwardly extending end portion 1, an annular groove 43 in which a sealing ring 44 is located for sealing engagement with the bore 45 of the upper sleeve. The stem also includes a narrow bridge portion 46 to the end of which is integrally formed the valve plate 47. Valve plate 47 has a pair of apertures 48 extending therethrough which are adapted to be in alignment, when the stem is turned to the valve open position, with the fluid inlet passages extending through the lower sleeve.

When the stem is turned to a closed position, the apertures 48 are unaligned with the inlet passages. The inlet seals 36 are urged by the springs 33 against the underside of valve plate 47 to thereby prevent the flow of fluid through the valve.

Referring again to the bridge 46 of the valve stem, it will be noted that when viewed in FIG. 1, it is of reduced cross sectional area, permitting the flow of water therearound. The bridge portion 46, as noted from FIG. 3 is of considerable length which permits a good mounting for a roll pin 50 extending snugly through the bridge. The pin extends from either end of the bridge portions so that the ends of the pin can engage the ends of the slots 4 formed in the lower sleeve. The pin 50 is inserted in the stem prior to assembly of the upper sleeve 8 into the lower sleeve 9.

With the above construction, the slots 4 act as stop means for limiting rotation of the valve stem, and they also act as the water passage for water flowing through the valve and out of the body. This results in a simplified construction with a minimum number of parts for the functions accomplished.

Furthermore, it will be noted that the pin 50 does not function to hold the parts together, and as the stem is being turned, the pin does not rub or contact the upper and lower sides of the slots 4, but instead the pin "floats" in the slots 4, thereby resulting in a particularly smoothly operating valve.

The present invention also provides a simple and economical valve having relatively few parts and which is easy and economical to manufacture. The valve is also easy to assemble and disassemble, the two sleeves being held together by the recess and projection connection, and the entire sleeve in turn being held in the body and locked against rotation by the lug and recess projection between the upper sleeve and the valve body.

I claim:

1. A valve cartridge comprising, a generally cylindrical lower sleeve having an internal fluid chamber, a pair of diametrically opposed and transversely arranged slots in said lower sleeve and communicating with said chamber, an upper sleeve disengagably connected with said lower sleeve, a recess and projection connection between said upper and lower sleeves whereby said sleeves rotate as a unit and are disengagable by axial relative movement therebetween, a stem rotatably mounted within said sleeves and having a bridge portion of reduced cross sectional area intermediate its length, a pin extending through said bridge portion for abuttment with the ends of said slots in said lower sleeve when said stem is turned a maximum in one direction or another, said pin moving freely within said slots during said turning movement, and a valve plate having aperture means therethrough and carried by the lower end of said stem, water inlet means in the lower end of said lower sleeve and alignable with said aperture means in said valve plate when said stem is turned to a valve open direction.

2. A valve cartridge as set forth in claim 1 in combination with a valve body having recess means in the upper end thereof, said upper sleeve having lugs extending therefrom and adapted to seat in said recesses to prevent turning of said sleeve within said body.

3. The combination as set forth in claim 2 including an end cap threadably engaged in the upper end of said body and having an inwardly turned flange for abuttment against said upper sleeve to hold the latter captive in said body.

4. A sleeve assembly for a valve cartridge, said assembly comprising a generally cylindrical lower sleeve having an internal fluid chamber, a pair of diametrically opposed and transversely arranged slots in said lower sleeve and communicating with said chamber, an upper sleeve disengagably connected with said lower sleeve, a recess and projection connection between said upper and lower sleeves whereby said sleeves rotate as a unit and are disengagable by axial relative movement therebetween, water inlet means in the lower end of said lower sleeve.

5. A sleeve assembly as set forth in claim 4 further characterzed in that said upper sleeve has lugs extending radially at one end thereof, and adapted to seat in a valve body.

6. The assembly set forth in claim 5 further characterized in that said upper sleeve has a radially inwardly turned flange for holding a valve stem captive therein.

7. A fluid valve assembly comprising; a cartridge having a generally cylindrical lower sleeve having an internal fluid chamber, a pair of diametrically opposed and transversely arranged slots in said lower sleeve and communicating with said chamber, an upper sleeve disengagably connected with said lower sleeve, a recess and projection connection between said upper and lower sleeves whereby said sleeves rotate as a unit and are disengagable by axial relative movement therebetween, a stem rotatably mounted within said sleeves and having a bridge portion of reduced cross sectional area intermediate its length, a pin extending through said bridge portion of abuttment with the ends of said slots in said lower sleeve when said stem is turned a maximum in one direction or another, said pin moving freely within said slots during said turning movement, and a valve plate having aperture means therethrough and carried by the lower end of said stem, water inlet means in the lower end of said lower sleeve and alignable with said aperture means in said valve plate when said stem is turned to a valve open direction; a valve body having recess means in the upper end thereof, said upper sleeve having lugs extending therefrom and adapted to seat in said recesses to prevent turning of said sleeve within said body, said upper sleeve also having a radially inwardly extending flange at the upper end thereof, said flange abutting against said stem to hold the latter captive in said upper sleeve, and an end cap threadably engaged on the upper end of said body and having an inwardly turned flange for abuttment against said upper sleeve to hold said cartridge captive in said body.

* * * * *